Patented Dec. 7, 1948

2,455,614

UNITED STATES PATENT OFFICE 2,455,614

COMPOSITIONS COMPRISING A POLYVINYL CHLORIDE RESIN STABILIZED WITH THE LEAD SALT OF ORTHO-SULFOBENZIMIDE

Russell H. Schlattman, Richmond Heights, Mo., assignor to Monsanto Chemical Company, St. Louis, Mo., a corporation of Delaware No Drawing. Application July 19, 1947, Serial No. 762,210

5 Claims. (Cl. 260—88)

This invention relates to improved compositions containing predominantly polymerized vinyl chloride. More particularly, this invention relates to plasticized compositions having improved heat stability and containing polymerized vinyl chloride, vinyl chloride copolymers, or combinations thereof, collectively and broadly herein referred to in the description and claims as "polyvinyl chloride compositions."

Polyvinyl chloride compositions have found many useful applications because of their wide range of elastomeric and mechanical properties coupled with their extreme resistance to oxidation, organic solvents, acids and alkalies. Typical of such applications are calendered films and sheeting for wearing apparel, shower curtains and seat and cushion coverings, extruded insulation for electrical wiring and injection molded rigid articles such as bottle caps, drawing instruments and floor coverings.

The processing techniques necessary for the fabrication of many of these articles from polyvinyl chloride compositions often require that the compositions be exposed to elevated temperatures for extended periods of time. The time and temperature of such exposures may vary from 10 minutes to 1 hour at temperatures of 130° C. to 160° C. It has been found, however, that under the more extreme conditions of time and temperature, many of the polyvinyl chloride compositions tend to deteriorate, resulting in darkening or discoloration. In many applications such deterioration is undesirable as accurate color control is quite difficult to maintain and articles of inferior or undesired coloration result. The evaluation of this tendency of a polyvinyl chloride composition to discolor on prolonged exposure to heat or elevated temperatures is commonly referred to by those skilled in the art as the composition's heat stability.

An object of this invention is to provide new compositions, particularly plasticized compositions, containing predominantly polyvinyl chloride and having improved heat stability. A further object is to provide a method for improving the heat stability of compositions containing predominantly polyvinyl chloride. Other objects of this invention will be apparent to those skilled in the art from the following description, examples and claims.

I have found that the heat stability of compositions containing predominantly polyvinyl chloride may be increased and the amount of discoloration of such compositions, when exposed to prolonged heating, may be substantially reduced by incorporating into the polyvinyl chloride composition minor amounts of the lead salt of ortho-sulfobenzimide. While I prefer to use lead ortho-sulfobenzimide in amounts of the order of 2% to 5% of the weight of the finished polyvinyl chloride composition, amounts as low as 0.5% may be advantageously used as a heat stabilizer for polyvinyl chloride compositions and the amount of lead ortho-sulfobenzimide incorporated into polyvinyl chloride compositions may be increased to 10% with desirable heat stabilizing results.

In order to test the desirability and utility of the above-mentioned lead salt of ortho-sulfobenzimide as a heat stabilizer for polyvinyl chloride compositions, a composition was prepared containing 58 parts by weight of a polyvinyl chloride resin formed by the polymerization of vinyl chloride, 40 parts of 2-ethylhexyl diphenyl phosphate plasticizer and 2 parts of the lead salt of ortho-sulfobenzimide. The said resin, plasticizer and stabilizer were intimately mixed and fluxed on a differential speed roll mill for 5 minutes at 160° C. When a homogeneous composition had formed on the roll, the plasticized polyvinyl chloride composition was sheeted off the roll mill. As a control, a second composition was prepared in the same manner containing 60 parts by weight of the same type of polyvinyl chloride resin, 40 parts by weight of 2-ethylhexyl diphenyl phosphate plasticizer but no heat stabilizer was added to the control composition.

Specimens of each of these compositions were then placed in a mold 2" x 2" x 0.040" and subjected to a pressure of 2,000 pounds per square inch and a temperature of 160° C. After being maintained at this pressure and temperature for 30 minutes the specimens were removed from the molds and the amount of discoloration in each sample observed. The control which contained no thermal stabilizer had become a dark red brown in color and was of very low transparency. On the other hand, the sample that contained the lead ortho-sulfobenzimide thermal stabilizer showed no discoloration, resulting in a transparent, colorless sheet.

A third composition was prepared containing 60 parts by weight of a polyvinyl chloride resin formed by the polymerization of vinyl chloride, 39 parts of 2-ethylhexyl diphenyl phosphate plasticizer and 1 part by weight of the lead salt of ortho-sulfobenzimide. This composition was rolled, fluxed, sheeted and molded as in the first example. After heating for 30 minutes at 325° F., this third composition was removed from the mold and evaluated for its heat stability. While the third composition, which contained 1% of the lead salt of ortho-sulfobenzimide, had a tannish discoloration, this sample had greatly improved heat stability characteristics over the control composition which contained no lead ortho-sulfobenzimide. However, the first composition which contained 2% of the lead salt of ortho-sulfobenzimide is preferred over the composition containing 1%.

A fourth composition contained 56 parts by weight of a polymerized vinyl chloride resin, 36 parts by weight of 2-ethylhexyl diphenyl phosphate plasticizer and 4 parts by weight of the lead salt of ortho-sulfobenzimide. This fourth composition was rolled, fluxed, sheeted and molded in the same manner as was the first composition. After heating in the mold for 30 minutes at 325° F., this fourth sample was removed from the mold and evaluated for its heat stability characteristics. The molded sample was substantially free from any type of discoloration and, therefore, had excellent heat stability characteristics.

A fifth composition was prepared containing 58 parts by weight of a polyvinyl chloride resin, 40 parts by weight of tricresyl phosphate and 2 parts by weight of the lead salt of ortho-sulfobenzimide. This fifth composition was rolled, fluxed, sheeted and molded as in the first example and after heating in the mold for 30 minutes at 325° F. the sample was removed from the mold and evaluated for its heat stability characteristics. While this sample had a very slight tannish discoloration, the heat stability of this composition was remarkably improved, as those skilled in the art realize that polyvinyl chloride resins plasticized with tricresyl phosphate are of the more difficult compositions to stabilize against the deleterious effects of increased temperatures of processing.

The compositions of this invention may also contain carbon black, zinc oxide, clay, wood flour, and other pigments and fillers commonly used in the plastics industry. The stabilizing effect of the thermal stabilizers of this invention are realized in unplasticized compositions as well as compositions that are plasticized with many of the other common plasticizers used in the plastic industry, such as dioctyl phthalate and tricresyl phosphate.

Many compounds and compositions which have been described in the prior art as "basic heat stabilizers," have been incorporated into compositions containing polyvinyl chloride to retard or prevent the initial discoloration or darkening which results from the processing of polyvinyl chloride compositions at elevated temperatures. The use of these basic heat stabilizers, such as basic lead silicate, basic lead carbonate, basic lead stearate and basic lead acetate, have resulted in compositions having improved heat stability characteristics but the degree of thermal stability to be achieved by the use of these basic heat stabilizers is not wholly satisfactory, particularly when the time of processing must be of the order of 30 minutes to 1 hour at temperatures of the order of 160° C. rather than relatively short processing times of the order of 5 to 15 minutes. However, I have found that by the use of the lead salt of ortho-sulfobenzimide in cooperation with the basic heat stabilizers, there is a synergistic heat stabilizing action of the basic heat stabilizers and the lead salt of ortho-sulfobenzimide resulting in compositions having thermal stabilities of improved proportions that cannot be achieved by the use of the basic heat stabilizers alone without the cooperation and synergistic heat stabilizing action of the lead salt of ortho-sulfobenzimide.

A sixth composition was prepared by intimately mixing 56 parts by weight of a polyvinyl chloride resin with 40 parts by weight of 2-ethylhexyl diphenyl phosphate plasticizer, 2 parts by weight of basic lead silicate and 2 parts by weight of the lead salt of ortho-sulfobenzimide. This composition was rolled, fluxed, sheeted and molded in the same manner as is described in the first example. After heating the composition in the mold for 30 minutes at 325° F., the sample was inspected for discoloration. The sample possessed excellent heat stability characteristics in that the sample was quite flexible, supple and there was no indication of any discoloration.

This synergistic heat stabilizing action of the lead salt of ortho-sulfobenzimide in polyvinyl chloride compositions has also been noted in the use of the lead salt of ortho-sulfobenzimide with other heat stabilizers which have been described in the prior art such as maleic anhydride.

Though particular reference has been made to compositions of polyvinyl chloride resins, the lead salt of ortho-sulfobenzimide may be very desirably used to heat stabilize compositions containing resins that are formed through the conjoint polymerization of mixtures of monomers that are predominantly vinyl chloride, such as mixtures of vinyl chloride and varying amounts of vinyl esters of carboxylic acids. These copolymers containing predominantly vinyl chloride are exemplified by copolymers containing 95 to 85% by weight of vinyl chloride and 5 to 15% by weight of vinyl acetate, vinylidine chloride, diethyl maleate or methyl methacrylate.

Though I have herein set forth specific embodiments of my invention, it is not my intention to be limited wholly thereto. For to those skilled in the art there are many apparent variations and modifications such as the variations of quantities used and a substitution of equivalent materials that do not depart from the scope of my invention as set forth in the following claims.

I claim:

1. A polymerized vinyl chloride composition characterized by improved heat stability and being comprised of a polymerized vinyl resin containing at least 85 percent of combined vinyl chloride and from 0.5 to 10 percent by weight of the lead salt of ortho-sulfobenzimide.

2. A plasticized polymerized vinyl chloride composition characterized by improved heat stability and being comprised of a polymerized vinyl resin containing at least 85 percent of combined vinyl chloride, a plasticizer and from 0.5 to 10 percent by weight of the lead salt of ortho-sulfobenzimide and from 0.5 to 10 percent by weight of a basic lead salt heat stabilizer.

3. A plasticized composition of matter comprising a polyvinyl chloride resin, a plasticizer, and from 0.5 to 10 percent by weight of the lead salt of ortho-sulfobenzimide.

4. A method of heat stabilizing polymerized masses that contain predominantly a polyvinyl chloride resin comprising incorporating therein from 0.5 to 10 percent by weight of the lead salt of ortho-sulfobenzimide.

5. A method of heat stabilizing plasticized compositions containing a polymerized vinyl resin of at least 85 percent of combined vinyl chloride comprising incorporating into the plasticized composition from 0.5 to 10 percent by weight of the lead salt of ortho-sulfobenzimide and from 0.5 to 10 percent by weight of a basic lead salt heat stabilizer.

RUSSELL H. SCHLATTMAN.

REFERENCES CITED

The following references are of record in the file of this patent:

UNITED STATES PATENTS

| Number | Name | Date |
|---|---|---|
| 2,319,953 | Scott | May 25, 1943 |
| 2,319,954 | Scott | May 25, 1943 |